March 3, 1970   G. R. BRADFORD   3,497,977
INTERCHANGEABLE ADVERTISING MEANS FOR LUNCH COUNTERS
AND MENU SUPPORT
Filed Nov. 30, 1967
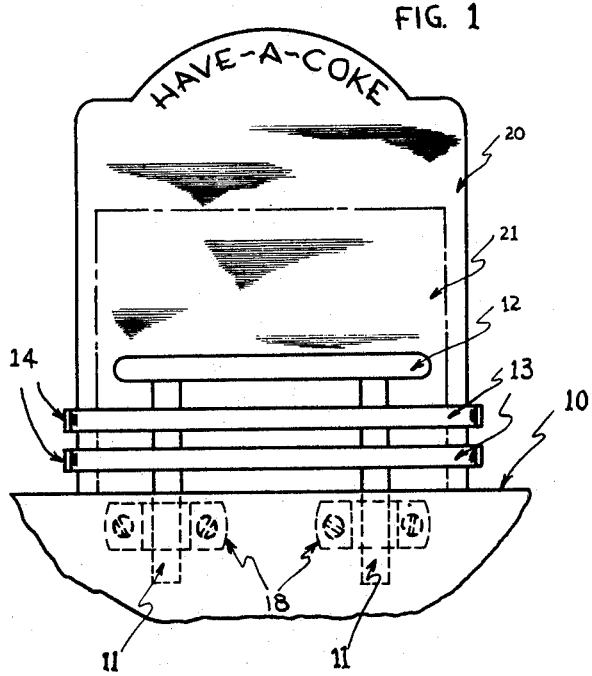
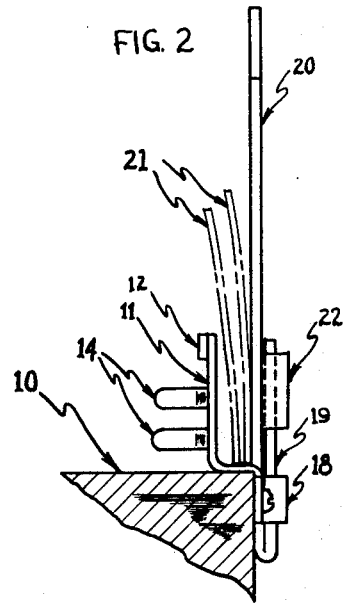
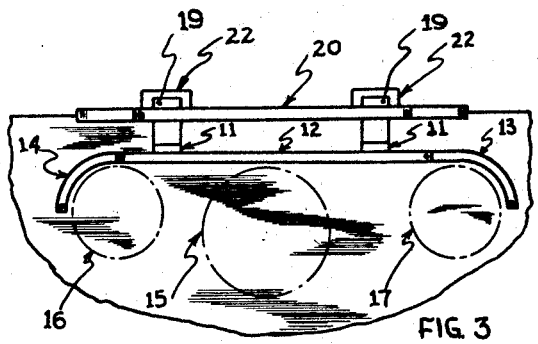
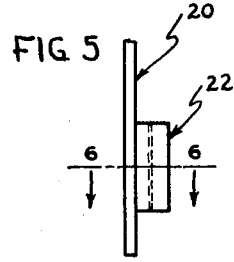
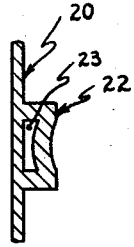
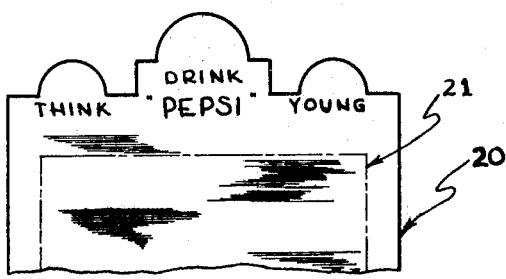
INVENTOR
GENE R. BRADFORD

United States Patent Office 3,497,977
Patented Mar. 3, 1970

3,497,977
INTERCHANGEABLE ADVERTISING MEANS FOR LUNCH COUNTERS AND MENU SUPPORT
Gene R. Bradford 1856 N. Sargent,
Stockton, Calif. 95201
Filed Nov. 30, 1967, Ser. No. 687,420
Int. Cl. G09f 3/18
U.S. Cl. 40—10                           2 Claims

ABSTRACT OF THE DISCLOSURE

A menu and support and condiment holder has a forward portion to position the condiments and a rear portion to hold the menu. The back wall of the menu holding portion is constituted by a display panel which removably attached and which extends upwardly above the other portion and thereby serves as a guide when the menu is placed in the menu holder.

---

My present invention relates to an advertising device for lunch counters and the like and more particularly to an improved condiment retaining and printed menu holding means having a back panel which will act as a guide for directing the menu into its proper place upon the holder in a convenient, practical and effective manner and also provide a novel advetrising means in full view when the menu is removed without interference with the condiments upon the counter.

Another object of the invention is to provide an improvement in condiment retainers as used on lunch counters by which different advertising material may be interchangeably exposed to view without detracting from the condiment retaining features thereof.

Other objects and advantages will be in part evident to those skilled in the art and in part pointed out hereinafter in connection with the accompanying drawing, wherein there is shown by way of illustration and not of limitation a preferred embodiment of the invention.

In the drawing wherein like numerals refer to like parts throughout the several views:

FIGURE 1 is a front view of my invention as applied to the rear side of a lunch counter, FIGURE 2 is a side view of the device as shown in FIGURE 1, FIGURE 3 is a top view of the device as shown in FIGURE 1, FIGURE 4 shows a different design for the advertising media, FIGURE 5 is an enlarged view showing a detail of construction, and FIGURE 6 is a sectional view taken along line 6—6 of FIGURE 5.

In the accompanying drawing, the numeral 10 designates the top surface of a counter of the type with which my improved support is adapted for use. The condiment positioning means of the device consists of two vertically extending straps 11, which carry a horizontal back stop member 12 and two horizontally extending condiment confining members 13 that are curved over the counter at their ends as at 14. In this form, the members 13 operate to provide an area or space within which condiments, as for example, a sugar bowl 15 and salt and pepper shakers 16 and 17, here shown by dot and dash lines, are located upon the counter 10.

As shown in FIGURE 2, the straps 11 are offset to dispose the horizontal back stop member 12 and the condiment confining members 13 over the surface of the counter. At their lower ends the straps 11 project into spaced clips 18 carried by the counter 10, in the manner as now practiced with devices of this character. In addition to providing the depending clip engaging portions the straps 11 are shown as doubled back to form an upstanding tongue 19 upon which an advertisement carrying panel member 20 of translucent or transparent plastic or other non-metallic material is held in a vertical position in back of the upstanding offset portion of the straps 11 to provide a space for a menu 21 or the like, here shown by dot and dash lines.

By constructing the panel 20 of a plastic or other like material in different ornamental forms any desired advertising material, embossed or otherwise applied, will be presented to the customer while at lunch. At the same time, because of its spaced upward extension as shown, the panel 20 will act as a back stop for the menu as the customer replaces the menu in its proper place upon the support. In this manner, misplacement and/or a dropping of the menu behind the counter, as so often occurs with present day holders, will be avoided. When the panel 20 is constructed it is contemplated that it will be provided with integrally formed rearwardly extending bosses 22 having a rectangular opening comparable to the dimensions of the upstanding tongues 19. To provide for a firm grip upon the tongues 19 the outer wall of these bosses 22 are bowed inwardly as at 23 so that when placed upon the tongues 19 they will be frictionally held thereupon.

While I have, for the sake of clearness and in order to disclose my invention so that the same can be readily understood, described and illustrated a specific form and arrangement, I desire to have it understood that this invention is not limited to the specific forms disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. A lunch counter advertising condiment locating and menu holding device, comprising spaced vertically extending straps having depending rearwardly offset portions for attachment to the rear side of a counter, horizontally extending members carried by said spaced vertically extending straps having curved ends extending over the counter to define a condiment accommodating area upon the surface of the counter, an upstanding tongue carried by the depending rearwardly offset portions of said straps located in spaced relation with said vertically extending straps and projecting above the level of the counter, an advertisement carrying panel of ornamental design, and means on the back surface of said panel for engagement with said upstanding tongues for positioning said advertisement carrying panel into view while forming a back stop with an unobstructed free space behind said vertically extending straps to accommodate a removable menu.

2. A combined lunch counter advertising condiment locating and menu holding device, comprising spaced vertically extending straps having depending rearwardly offset portions for attachment to the rear side of a counter, horizontally extending members carried by said spaced vertically extending straps having curved ends extending over the counter to define a condiment accommodating area upon the surface of the counter, characterized by the fact that the depending rearwardly offset portions of said straps are folded upon themselves to provide an upstanding tongue in space relation with said vertically extending straps and projecting above the level of the counter, a support means carried by the lunch counter engaged by the depending rearwardly offset portions of said straps, an advertisement carrying panel of ornamental design, and means carried by said panel for engagement with said upstanding tongues for positioning said advertisement carrying panel into view as a back stop with an unobstructed free space behind said vertically extending straps to accommodate a removable menu.

References Cited

UNITED STATES PATENTS

| 1,983,187 | 12/1934 | Oswell | 40—11 X |
| 2,183,805 | 12/1939 | Bloomfield | 40—11 |
| 3,014,295 | 12/1961 | Aitkens | 40—11 |

EUGENE R. CAPOZIO, Primary Examiner

W. J. CONTRERAS, Assistant Examiner